US012803978B2

(12) United States Patent
Yasarapu et al.

(10) Patent No.: US 12,803,978 B2
(45) **Date of Patent: *Nov. 17, 2026**

(54) SYSTEMS AND METHODS FOR IMPROVED ELECTRONIC DATA SECURITY

(71) Applicant: MASTERCARD INTERNATIONAL INCORPORATED, Purchase, NY (US)

(72) Inventors: Lova Padmini Devi Yasarapu, Town and Country, MO (US); Jarrett Northington, Wentzville, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/059,821

(22) Filed: Feb. 21, 2025

(65) Prior Publication Data

US 2025/0193184 A1 Jun. 12, 2025

Related U.S. Application Data

(63) Continuation of application No. 15/499,709, filed on Apr. 27, 2017, now Pat. No. 12,238,096.

(51) Int. Cl.
*G06Q 50/26* (2024.01)
*G06F 21/34* (2013.01)
(Continued)

(52) U.S. Cl.
CPC .......... *H04L 63/0876* (2013.01); *G06F 21/34* (2013.01); *G06F 21/43* (2013.01); (Continued)

(58) Field of Classification Search
CPC .................................................. H04L 63/0876
See application file for complete search history.

(56) References Cited

U.S. PATENT DOCUMENTS 6,163,771 A 12/2000 Walker et al.
6,327,578 B1 12/2001 Linehan
(Continued)

FOREIGN PATENT DOCUMENTS

EP 3096274 A2 11/2016

OTHER PUBLICATIONS

PCT International Search Report and Written Opinion, Application No. PCT/US2018/025015, dated Jun. 4, 2018, 14 pps.

*Primary Examiner* — John W Hayes
*Assistant Examiner* — Zehra Raza
(74) *Attorney, Agent, or Firm* — Armstrong Teasdale LLP

(57) ABSTRACT

An electronic data protection (EDP) computing device for protecting sensitive data of a user during a computer interaction between the user and a business entity computing device associated with a business entity is provided. The EDP computing device is configured to receive interaction data for the computer interaction from the business entity computing device. The interaction data includes an interaction identifier, a business entity identifier, and a user identifier in lieu of a protected data object. The EDP computing device generates a token request message using the interaction data and a request token and transmits the token request message to the user computing device, prompting the user to pick a user account. The EDP computing device receives a response token identifying an account selected to complete the computer interaction, retrieves the protected data object, and completes the computer interaction using the protected data object.

20 Claims, 5 Drawing Sheets

(51) Int. Cl.

| | |
|---|---|
| ***G06F 21/43*** | (2013.01) |
| ***G06F 21/62*** | (2013.01) |
| ***G06Q 20/22*** | (2012.01) |
| ***G06Q 20/38*** | (2012.01) |
| ***G06Q 20/42*** | (2012.01) |
| ***H04L 9/40*** | (2022.01) |

(52) U.S. Cl.
CPC ....... *G06F 21/6272* (2013.01); *G06Q 20/227* (2013.01); *G06Q 20/385* (2013.01); *G06Q 20/425* (2013.01); *G06Q 50/265* (2013.01)

(56) References Cited

U.S. PATENT DOCUMENTS

| | | | |
|---|---|---|---|
| 6,516,996 | B1 | 2/2003 | Lassi |
| 7,379,916 | B1 | 5/2008 | Mizrah |
| 7,430,540 | B1 | 9/2008 | Asani |
| 8,423,457 | B1 | 4/2013 | Schattauer et al. |
| 8,977,568 | B1 | 3/2015 | Schattauer et al. |
| 10,108,956 | B2 | 10/2018 | Wankmueller |
| 2002/0026412 | A1 | 2/2002 | Kabin |
| 2002/0083009 | A1 | 6/2002 | Lansing et al. |
| 2005/0261984 | A1 | 11/2005 | Hutchison et al. |
| 2005/0289086 | A1 | 12/2005 | Afariogun |
| 2013/0036051 | A1 | 2/2013 | Giordano et al. |
| 2013/0054414 | A1 | 2/2013 | Tarnanen |
| 2013/0297390 | A1 | 11/2013 | Jaquez et al. |
| 2014/0075570 | A1 | 3/2014 | Hsu et al. |
| 2015/0019443 | A1 | 1/2015 | Sheets et al. |
| 2015/0088736 | A1 | 3/2015 | Bu et al. |
| 2015/0195268 | A1 | 7/2015 | Fang |
| 2017/0024738 | A1 | 1/2017 | Vaidyanathan |
| 2017/0286958 | A1 | 10/2017 | Herman |
| 2017/0352034 | A1 | 12/2017 | Yu |

SYSTEMS AND METHODS FOR IMPROVED ELECTRONIC DATA SECURITY

CROSS REFERENCE TO RELATED APPLICATIONS

This application is a continuation of U.S. patent application Ser. No. 15/499,709, filed Apr. 27, 2017, entitled "SYSTEMS AND METHODS FOR IMPROVED ELECTRONIC DATA SECURITY", the content and disclosure of which are incorporated herein by reference in their entirety.

BACKGROUND

This disclosure relates to improving electronic data security by leveraging alternate means of data communication, and more specifically to methods and systems for preventing the electronic dissemination of protected data during a computer interaction.

Many computer systems involve exchange of protected data between one or more electronic end points. This data may require protection because it can be used to uniquely identify a person. Accordingly, it can be used to impersonate someone or steal someone's identity. Similarly, protected data may include financial account data because it is capable of being used to negatively impact someone's financial status. For example, an unauthorized person may use stolen financial data to conduct a transaction or simply to take funds without detection. Accordingly, many computer systems provide techniques to prevent data from falling into the hands of unauthorized persons.

Some known systems are limited in their ability to protect sensitive or personally identifiable data. These systems provide methods to conceal protected data but these methods nevertheless expose the data at certain points in the process. For example, some known systems require a user to present a username and password before being able to access protected data (e.g., financial account data). However, an unauthorized person may be able to conduct schemes such as phishing or "man-in-the-middle" attacks to acquire the username and password, and subsequently access the protected data. The username/password system is then unable to protect the protected data. Other known systems involve a user entering protected data into an unprotected computer device. For example, during an online transaction, a user will purchase an item from a merchant by providing financial account data such as an account number. While in transit between computing devices operated by the merchant, bank (s), and the user, the account number or other financial account data may be compromised. Attacks such as "packet-sniffing" or other network intrusions can be used to intercept and log network traffic across these computing devices and result in unauthorized users acquiring financial account data.

BRIEF DESCRIPTION

In one aspect, an electronic data protection (EDP) computing device for protecting sensitive data of a user during a computer interaction between the user and a business entity computing device associated with a business entity is provided. The EDP computing device is communicatively coupled to a memory device. The EDP computing device is configured to receive interaction data for the computer interaction from the business entity computing device, the interaction data including an interaction identifier, a business entity identifier, and a user identifier that is transmitted by the user to the business entity computing device in lieu of transmitting a protected data object during the computer interaction, generate a token request message that includes the interaction identifier, the business entity identifier, and a request token configured to establish a secure communication channel with a user application that stores account data for one or more user accounts on the user computing device, transmit the token request message to the user computing device, wherein the transmission prompts the user to select from the one or more user accounts, receive, from the user computing device, a token response message that includes a response token that identifies a first user account selected by the user to complete the computer interaction, perform a lookup in the memory device, using the first user account, to retrieve the protected data object, the protected data object being associated with the first user account, and complete the computer interaction using the protected data object.

In another aspect, a method of protecting sensitive data of a user during a computer interaction between the user and a business entity computing device associated with a business entity is provided. The method is implemented using an electronic data protection (EDP) computing device communicatively coupled to a memory device. The method comprises receiving interaction data for the computer interaction from the business entity computing device, the interaction data including an interaction identifier, a business entity identifier, and a user identifier that is transmitted by the user to the business entity computing device in lieu of transmitting a protected data object during the computer interaction, generating a token request message that includes the interaction identifier, the business entity identifier, and a request token configured to establish a secure communication channel with a user application that stores account data for one or more user accounts on the user computing device, transmitting the token request message to the user computing device, wherein the transmission prompts the user to select from the one or more user accounts, receiving, from the user computing device, a token response message that includes a response token that identifies a first user account selected by the user to complete the computer interaction, performing a lookup in the memory device, using the first user account, to retrieve the protected data object, the protected data object being associated with the first user account, and completing the computer interaction using the protected data object.

In yet another aspect, a non-transitory computer readable medium that includes computer executable instructions for protecting sensitive data of a user during a computer interaction between the user and a business entity computing device associated with a business entity is provided. When executed by an EDP computing device including a processor and a memory device, the computer executable instructions cause the EDP computing device to receive interaction data for the computer interaction from the business entity computing device, the interaction data including an interaction identifier, a business entity identifier, and a user identifier that is transmitted by the user to the business entity computing device in lieu of transmitting a protected data object during the computer interaction, generate a token request message that includes the interaction identifier, the business entity identifier, and a request token configured to establish a secure communication channel with a user application that stores account data for one or more user accounts on the user computing device, transmit the token request message to the user computing device, wherein the transmission prompts the user to select from the one or more user accounts, receive, from the user computing device, a token response message that includes a response token that identifies a first user account selected by the user to complete the computer interaction, perform a lookup in the memory device, using the first user account, to retrieve the protected data object, the protected data object being associated with the first user account, and complete the computer interaction using the protected data object.

BRIEF DESCRIPTION OF THE DRAWINGS

FIG. 1 illustrates an example configuration of an EDP computing device that is configured to protect sensitive data of a user during a computer interaction.

FIG. 2 shows a first example message flow by which an EDP computing device protects sensitive data of a user during a computer interaction.

FIG. 3 shows a second example message flow by which an EDP computing device protects sensitive data of a user during a computer interaction.

FIG. 4 shows an example method flow 400 illustrating how the EDP computing device protects sensitive data of a user during a computer interaction.

FIG. 5 shows an example configuration of a database within a computer device, along with other related computer components, that may be used to protects sensitive data of a user during a computer interaction.

Like numbers in the Figures indicate the same or functionally similar components.

DETAILED DESCRIPTION

Figure 1:
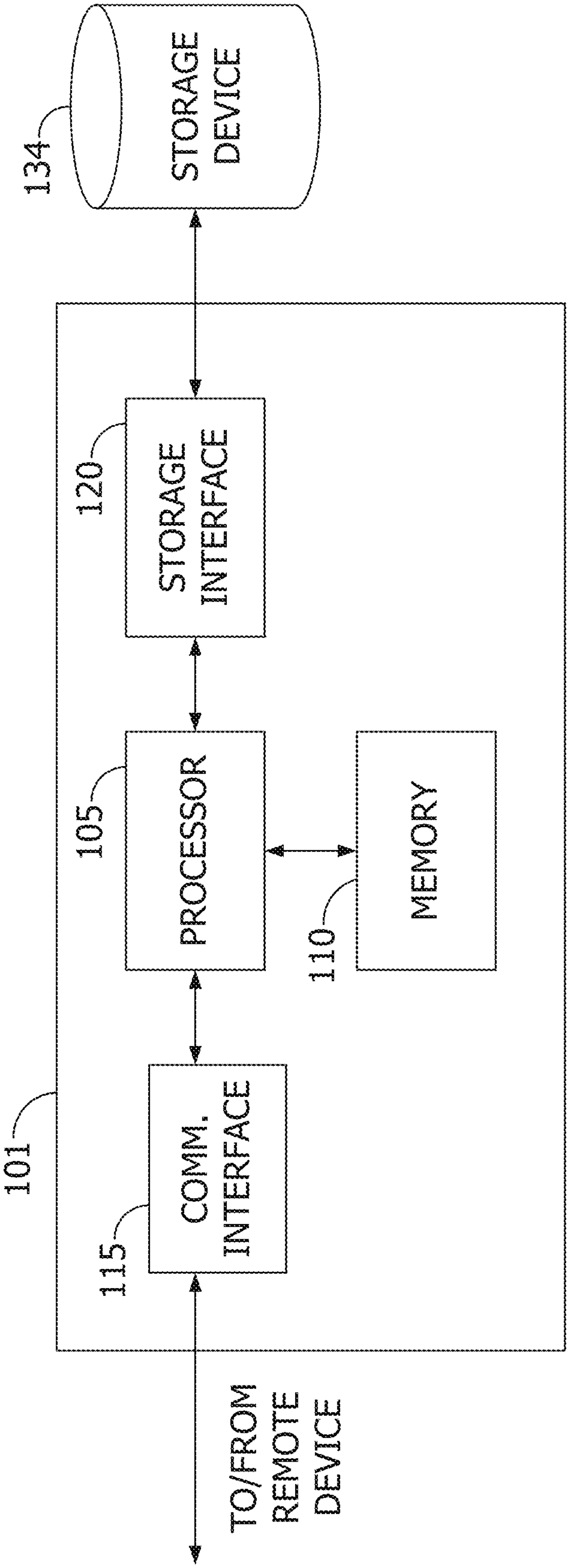
FIGS. 1-5 show example embodiments of the methods and systems described herein.

The systems and methods described herein relate generally to protecting electronic data (including protected data) using an electronic data protection (EDP) computing device. More specifically, the systems and methods described herein enable protection of certain sensitive data (also referred to herein as "protected data" or "protected data objects") by providing ways of offering other data objects in lieu of providing sensitive data in a computer interaction.

An overview of example embodiments is provided herein. In one example embodiment, the EDP computing device communicates with a user computing device operated by a user. The user will register with the EDP computing device in a registration process. As part of the registration process, the user provides one or more protected data objects to the EDP computing device. For example, the user may provide to the EDP computing device financial or other account data that can be used to initiate a payment transaction. In addition, the user also provides an unprotected data object (also referred to herein as a "user identifier"). The user does not consider it a security risk if the user identifier is shared with, for example, a business entity computing device. For example, the user provides, to the EDP computing device, a telephone number as the user identifier. As another example, the user provides a user-generated user identifier (which may be composed of some combination of letters, numbers, and symbols). As yet another example, the EDP computing device will suggest a user identifier to the user. The user identifier suggested by the EDP computing device may be generated using a random character generator or may be generated using other unprotected data objects of the user (e.g., the user's name). The protected data object(s) and unprotected data object(s) are collectively referred to herein as registration data.

The EDP computing device is configured to store the registration data. Moreover, the EDP computing device generates one or more electronic links between the received registration data. More specifically, the EDP computing device will store the registration data in a database and the generated links will represent database associations (e.g., by using foreign keys in a relational database system). For example, the EDP computing device will link a telephone number to an account number provided by the user. These electronic links between data serve as security measures because they obviate the need for the user to present protected data objects to a third party like the business entity computing device. The user can instead simply present an unprotected data object (e.g., a user identifier like a telephone number) to the third party. Moreover, the abovementioned electronic links at the EDP computing device eliminate the need for individual third parties (e.g., those that that operate business entity computing devices) to create and maintain these links. Third parties also need not create special computer infrastructure and security mechanisms for the purpose of maintaining users' protected data objects. The abovementioned functions of the EDP computing device also reduce security risks arising from the unnecessary proliferation of users' protected data objects (e.g., because multiple business entity computing devices will not store the protected data objects).

Relatedly, the EDP computing device is configured to communicate with the abovementioned business entity computing device(s) so that a third party can complete a computer interaction in progress with the user (or user computing device). Where a user is prompted to provide a protected data object to the business entity computing device, the user instead offers the user identifier. The business entity computing device provides this user identifier and other data to the EDP computing device. The EDP computing device retrieves the protected data object that was previously electronically linked or associated with the user identifier and determines how the computer interaction is to be completed. For example, the computer interaction will require communication with additional computer devices. As a specific example, during a payment transaction, the EDP computing device will use a retrieved financial account number to communicate with bank computing devices. When communicating with bank computing devices, the EDP computing device is able to use specific security mechanisms that are not available at the user's point of interaction with the business entity computing device. For example, if the business entity computing device is a merchant point of sale (POS) device, an unauthorized user may take control of the POS device to acquire user data.

In an example embodiment, the user will engage the user computing device in a computer interaction with a business entity computing device. In this embodiment, the computer interaction is performed by the interaction of a user computing device with a remote business entity computing device. For example, a user may use a mobile computing device at the user's home to communicate with a website server computer of a business entity in order to initiate the computer interaction. Alternatively, the user may also initiate the computer interaction in a physical location of the business entity. For example, during a payment transaction in a merchant's store location, the user may be prompted to swipe or tap a payment card against a merchant POS device. As another example, the user may be prompted to verbally provide a protected data object (e.g., a financial account number) or enter it into the POS device such that it is recordable by the merchant.

As described above, the business entity computing device transmits the user identifier to the EDP computing device. The EDP computing device, on receipt of the user identifier, communicates with the business entity computing device and other computing devices to complete the computer interaction for the user without the user having to offer the protected data. Additionally, the EDP computing device requests the user to confirm the computer interaction. The user may use a user application, if available on the user computing device, to confirm the computer interaction. In an alternative embodiment, the EDP computing device provides the user with a unique key identifier that the user is then prompted to provide using a website or some other communication channel in order to confirm that the computer interaction should be completed.

An example embodiment is described herein in greater detail. In at least some implementations, the EDP computing device is communicatively coupled to a memory device that stores account data for one or more users. The account data may include protected data that the user does not wish to share directly with the business entity directly. For example, the memory device may store account data for a user's financial account. During an electronic payment transaction, the user may not wish to directly provide this account data to a business entity, such as a merchant.

Additionally, the EDP computing device is communicatively coupled to a user computing device that is configured to display a user interface (e.g., a web site or computer application). The user computing device also hosts one or more computer applications, including a user application as described herein in more detail. In one embodiment, the user application, among other functions, manages one or more user accounts for the user. For example, the user application may be an electronic wallet application that holds one or more electronic financial accounts for the user that the user may use to pay for goods and services in payment transactions. In another example, the user application may be a password management application that holds multiple passwords or passcodes for the user so that the user does not have to remember all the different passwords or passcodes.

In at least some implementations, a user initiates a computer interaction that involves a business entity computing device. As used herein, a computer interaction includes using the user computing device to connect to or otherwise interact with a business entity computing device. For example, the computer interaction may be a payment transaction. The payment transaction may involve a user seeking to purchase an item from a merchant by using a user computing device to communicate account data or order data to a merchant computing device (e.g., a point-of-sale (POS) computing device or terminal). The account data may include an account number and/or other information that would identify a financial account of the user (e.g., account name, expiration date, passwords, passcodes, or the like). The user may not wish to transmit the account number itself from the user computing device to the merchant computing device (or otherwise provide the account number, such as verbally or by entering it into the merchant computing device), due to the security reasons identified above. Accordingly, the systems and methods described herein apply the EDP computing device to complete the computer interaction where the user declines to provide required data to complete the interaction (e.g., where the user does not wish to provide an account number that a merchant requests to complete a payment transaction).

To address the abovementioned security challenges, the EDP computing device is configured to receive interaction data for the computer interaction from the business entity computing device. During the computer interaction, the user will provide publicly available data about the user to the business entity computing device. In the example embodiment, the user will provide a user identifier. For example, the user may provide the user's telephone number to the business entity computing device, rather than providing the financial account information such as the account number. The business entity computing device receives the user identifier and transmits it to the EDP computing device as part of a data transmission referred to herein as interaction data. In some embodiments, the business entity computing device will include an interaction identifier and a business entity identifier within the interaction data. In the example of the payment transaction, the business entity identifier may be a merchant identifier (e.g., a merchant name or other ID). The interaction identifier may be a transaction identifier (e.g., a transaction number, transaction date, transaction time or the like). Additional data may be included, such as a transaction amount in the case of a purchase.

The EDP computing device is configured to retrieve certain user data that will assist in completing the computer interaction. As noted earlier, the user has declined to provide data that the business entity computing device may otherwise require to complete the interaction. Accordingly, the EDP computing device extracts the user identifier from the interaction data received from the business entity computing device. The EDP computing device is configured to then search, within an associated database, for user data that can be used to complete the computer interaction. For example, the EDP computing device will first determine whether the user uses a user application to manage user accounts as described above. For example, the user may have an electronic wallet application that manages one or more financial accounts for the user. If so, the EDP computing device will request selection of an account from the electronic wallet application using a request token.

In one embodiment, the EDP computing device generates a request token and encapsulates the request token in a token request message. The token request message is configured to establish a secure communication channel with a user application installed on the user computing device. The objective is to confirm that the user has in fact initiated the computer interaction and, if so, to receive a response that confirms the computer interaction. Additionally, the token request message also includes the interaction identifier and the business entity identifier received from the business entity computing device. The interaction identifier and business entity identifier serve to identify the computer interaction for which account data is being requested. For example, a transaction identifier and a merchant name may be included in the token request message. Other data may also be included (e.g., a transaction amount, transaction date/time, and identifiers for purchased goods/services, in the case of a payment transaction).

In one embodiment, the token request message also includes an expiration time window. The expiration time window, as used herein, is an amount of time that the user has to respond to the token request message. The expiration time window serves to help complete the computer interaction more efficiently. In other words, the user is given a definite amount of time to respond with either a confirmation or denial of the computer interaction. Additionally, if the computer interaction was not initiated by the user, the user may simply ignore the token request message and allow it to time out. Whether the user did in fact initiate the token request message or not, the EDP computing device ensures that sensitive data of the user (e.g., payment card information) is protected since the user does not need to provide it to the business entity computing device.

The token request message is transmitted to the user computing device. More specifically, the token request message is transmitted as a message within the user application. For example, where the user application is an electronic wallet application, the electronic wallet application may include a messaging feature that displays the token request message. In a related embodiment, the token request message is configured to cause the user computing device to display a banner alert, text alert, audio alert, or other notification method. One or more of these notification methods may be used to notify the user that a token request message has arrived.

If the user chooses to respond to the token request message, the user is prompted to provide a token response message using the user computing device. More specifically, the user provides, within the expiration time window, a selection of a user account that will be used to complete the computer interaction. In the example of a payment transaction where a request token was sent to the user computing device, the request token is processed by the user application. In one embodiment, the user application then generates a response token (or access token) that is then included within the token response message.

In an alternative embodiment, the EDP computing device may determine that the user does not have a user application as described above. If so, the EDP computing device generates a unique key identifier and includes it within the token request message. Additionally, since a user application may not exist, the EDP computing device is configured to determine an alternate transmission method for the token request message. For example, the EDP computing device may transmit the token request message via a short message service (SMS) message, or an electronic mail message, or the like. In a related embodiment, the EDP computing device is configured to use the user identifier to access notification preferences of the user to determine preferred notification methods and times for the user. Using these notification preferences, the EDP computing device transmits the token request message to the user.

In the alternative embodiment, the token request message includes the unique key identifier and also a prompt to provide the unique key identifier to the EDP computing device to be able to complete the transaction. As an example, the user may be prompted to visit a particular website associated with the EDP computing device. The website address will be provided within the token request message. The user will navigate to the website, enter the unique key identifier, and by doing so, confirm that the user initiated and wishes to complete the computer interaction. As noted earlier, the user does not provide any sensitive or protected data. As another example, the EDP computing device may prompt the user to transmit an SMS message providing the unique key identifier. Once the user provides the response token or the unique key identifier, the EDP computing device is configured to complete the computer interaction.

For completion, certain computer interactions involve specific data transmission sequences that will be modified by the EDP computing device in some embodiments. The EDP computing device is configured to modify a variety of existing computer interactions. The example of a payment transaction is described herein in greater detail for purposes of illustration only. For example, a transaction involving a payment card will begin with a user presenting a payment card to a merchant, and the merchant using payment card data (e.g., an account number which may be a protected data object) to create an authorization request message. This authorization request message is then sent to a payment processor computing device that processes electronic payments. The payment processor computing device will transmit the authorization request message to an issuing bank computing device which is associated with the issuing bank that issued the user's payment card account. Once the issuing bank computing device confirms that the user's payment card account contains sufficient funds for the transaction, the issuing bank computing device transmits an authorization response message confirming this to the payment processor computing device. The payment processor computing device then transmits the authorization response to an acquiring bank computing device which is associated with an acquiring bank that holds an account for the merchant. The acquiring bank, issuing bank, and payment processor computing device exchange additional messages either at the time of the payment transaction or in a later batch process that lead to the user's account being debited by an amount equal to a credit that is placed in the merchant's account.

In embodiments of this disclosure, the EDP computing device is configured to modify the above sequence for payment transactions. In one embodiment, the EDP computing device is configured to be communicatively coupled to the payment processing computing device that is described above. In this embodiment, the EDP computing device will enable the payment processor computing device to participate in the systems and methods described herein. As an example, the EDP computing device will transmit a modified form to participating merchants for merchant computing devices to use when transmitting user inputs that include a user identifier instead of the expected payment card data. For example, the modified form may include a text box for a user identifier rather than the one or more text boxes used for payment account data. Accordingly, the authorization request message from the merchant to the payment processor computing device will use this form instead of the standard authorization request communication. When the payment processor computing device receives the modified form, it will include the user identifier instead of the payment account data. The EDP computing device will retrieve the payment card data that was previously associated with the user identifier and provide it to the payment processor computing device. The payment processor computing device (or the EDP computing device) can then substitute the payment card data for the user identifier and transmit an authorization request message to, for example, an issuing bank computing device.

As another example, the EDP computing device is configured to generate authorization request messages. In this example, the merchant does not generate the authorization request message and instead provides the user identifier and relevant transaction data (e.g., transaction amount, transaction date/time) in some other format to the EDP computing device. The EDP computing device is configured to receive this data and transform it into an authorization request message that can be processed by an issuing bank computing device. For example, the EDP computing device is configured to generate an authorization request message in ISO 8583® format (ISO is a registered trademark of the International Organization for Standardization, headquartered in Geneva, Switzerland. ISO 8583 ["Financial transaction card originated messages—Interchange message specifications"] is the ISO® standard for systems that exchange electronic transactions made by cardholders using payment cards). After creating the authorization request message, the EDP computing device transmits it to the issuing bank computing device for continued processing and completion of the payment transaction as described above.

The technical problems addressed by this system include at least one of: (i) limitations of systems that require a user to provide protected data before proceeding with a payment transaction, (ii) the lack of access to protected data by certain systems, leading to these systems requiring a user to provide this protected data before proceeding with a computer interaction, and (iii) inability of some known systems to complete a computer interaction when only a publicly available user identifier is provided.

The methods and systems described herein may be implemented using computer programming or engineering techniques including computer software, firmware, hardware, or any combination or subset thereof, wherein the technical effects may be achieved by a) receiving interaction data for the computer interaction from the business entity computing device, the interaction data including an interaction identifier, a business entity identifier, and a user identifier that is transmitted by the user to the business entity computing device in lieu of transmitting a protected data object during the computer interaction, b) generating a token request message that includes the interaction identifier, the business entity identifier, and a request token configured to establish a secure communication channel with a user application that stores account data for one or more user accounts on the user computing device, c) transmitting the token request message to the user computing device, wherein the transmission prompts the user to select from the one or more user accounts, d) receiving, from the user computing device, a token response message that includes a response token that identifies a first user account selected by the user to complete the computer interaction, e) performing a lookup in the memory device, using the first user account, to retrieve the protected data object, the protected data object being associated with the first user account, and f) completing the computer interaction using the protected data object.

The resulting technical benefits achieved by this system include at least one of: (i) improved system experiences because a user is not required to submit protected data when initiating a computer interaction, so the user feels greater comfort and trust in initiating further computer interactions, (ii) improved data security because users' protected data is not propagated across different communication channels unnecessarily, (iii) improved network traffic because less data is traveling to and from the user computing device now that protected data (and accompanying security measures) need not be transmitted, (iv) reduced need for higher security protocols at business entity computing devices that are no longer handling transmissions of protected data from users, (v) reduced need for heightened security protocols for communication channels between the user computing device and devices such as the EDP computing device since only publicly available data (e.g., user identifiers like telephone numbers) or unique key identifiers (which are valueless outside the context of the described embodiments) are transmitted to and from the user computing device, (vi) increased data security because the claimed systems and methods serve to authenticate the user by requesting confirmation using the token request message, thereby confirming that a legitimate user initiated the computer interaction.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable storage medium. In an example embodiment, the system is executed on a single computer system, without requiring a connection to a server computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application in industrial, commercial, and academic applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 illustrates an example configuration of an EDP computing device 101 that is configured to protect sensitive data of a user during a computer interaction. EDP computing device 101 includes a processor 105 for executing instructions. Instructions may be stored in a memory area 110, for example. Processor 105 may include one or more processing units (e.g., in a multi-core configuration) for executing instructions. The instructions may be executed within a variety of different operating systems on EDP computing device 101, such as UNIX, LINUX, Microsoft Windows®, etc. More specifically, the instructions may cause various data manipulations on data stored in storage device 134 (e.g., create, read, update, and delete procedures). It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc.). Processor 105 is operatively coupled to a communication interface 115 such that EDP computing device 101 is capable of communicating with a remote device such as a user computer device.

Processor 105 may also be operatively coupled to a storage device 134. Storage device 134 is any computer-operated hardware suitable for storing and/or retrieving data. In some embodiments, storage device 134 is integrated in EDP computing device 101. In other embodiments, storage device 134 is external to EDP computing device 101. For example, EDP computing device 101 may include one or more hard disk drives as storage device 134. In other embodiments, storage device 134 is external to EDP computing device 101. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 105 is operatively coupled to storage device 134 via a storage interface 120. Storage interface 120 is any component capable of providing processor 105 with access to storage device 134. Storage interface 120 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 105 with access to storage device 134.

Memory area 110 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 2:
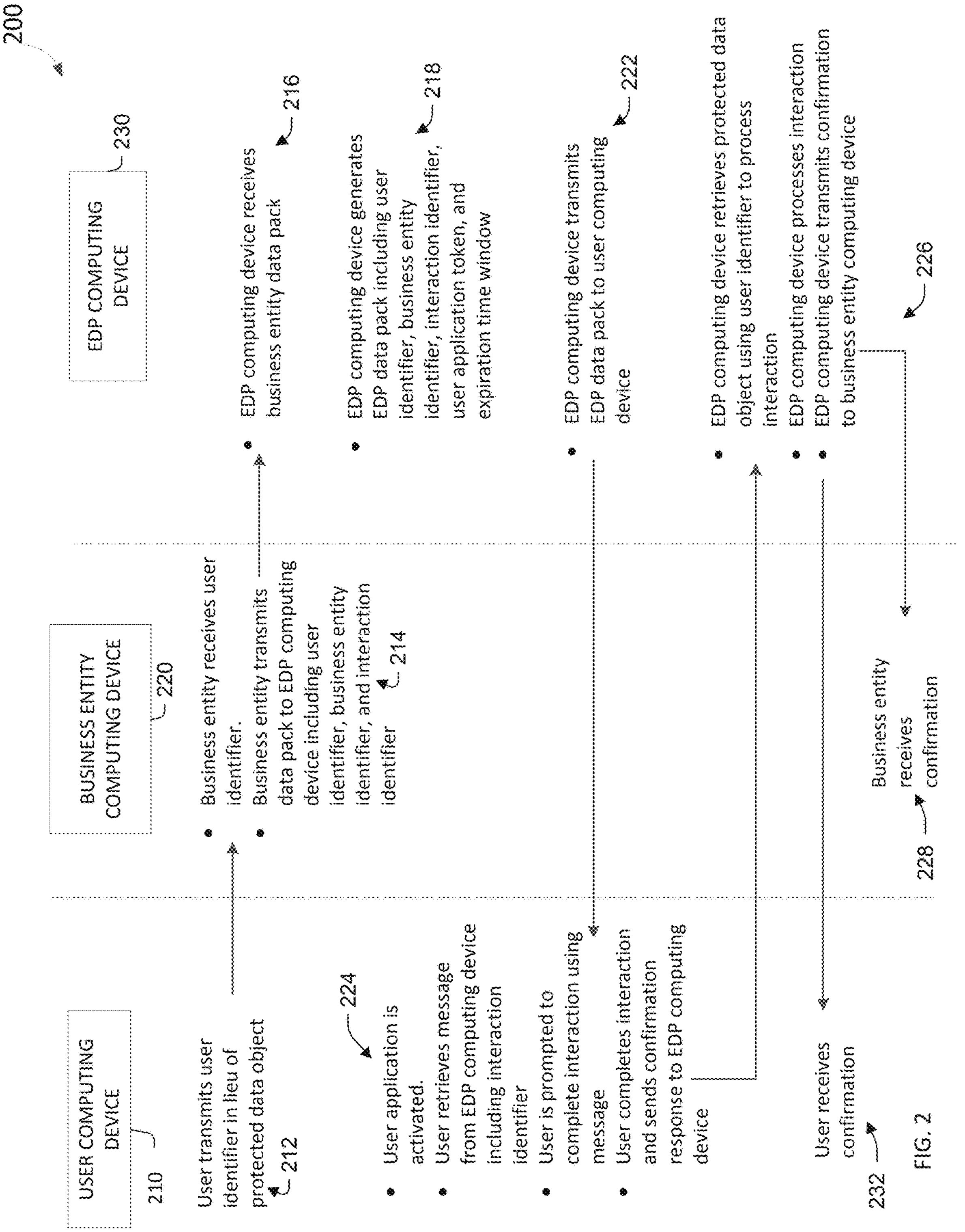

FIG. 2 shows an example message flow 200 by which an EDP computing device 230 (similar to EDP computing device 101 as described in FIG. 1) protects sensitive data of a user during a computer interaction. As shown, message flow 200 includes user computing device 210, business entity computing device 220, and EDP computing device 230 (similar to EDP computing device 101 as shown in FIG. 1). As shown in FIG. 2, message flow 200 begins when, during a computer interaction, a user uses user computing device 210 to transmit 212 a user identifier to business entity computing device 220. As described earlier, the computer interaction is such that a business entity computing device requires a protected data object (e.g., a payment card identifier) to continue the transaction.

However, when the user identifier is offered instead of the protected data object, business entity computing device 220 creates a data packet at 214, referred to herein as interaction data. This interaction data includes the user identifier, in addition to a business entity identifier and an interaction identifier. Continuing with the example of a payment transaction, the business entity identifier may be a merchant name, and the interaction identifier may be a transaction identifier generated by a merchant. Business entity computing device 220 transmits the interaction data to EDP computing device 230.

EDP computing device 230 is configured to receive 216 the interaction data and use it to determine the protected data object that the user did not provide due to security concerns. As described earlier, EDP computing device 230 is communicatively coupled to a memory device (e.g., storage device 134 as described with respect to FIG. 1). In the example embodiment, the memory device stores protected data objects for various users (e.g. account data). The user identifier prompts EDP computing device 230 to generate a token request message that includes the interaction identifier, the business entity identifier, and a request token. The request token is configured to establish a secure communication channel with a user application that stores account data for one or more user accounts on user computing device 210. The request token is also configured to prompt the user to select an account from the one or more user accounts managed by the user application on user computing device 210.

At 222, EDP computing device 230 transmits the token request message to user computing device 210. Additionally, EDP computing device 230 tracks the elapsed time and continuously compares it to the end of the expiration time window in order to ensure that a response is received within the expiration time window. The token request message is configured to cause user computing device 210 to activate the user application and display a prompt on user computing device 210 for the user to send a transmission to EDP computing device 230. More specifically, at 224, the user application is activated. A message is displayed within the user application showing the interaction identifier and a prompt to respond to the message. The user responds to the message to confirm that the user initiated the computer interaction and wishes to complete it. The user application then generates a response token and includes it within a token response message. The token response message is transmitted back to EDP computing device 230.

Once EDP computing device 230 receives the token response message, EDP computing device 230 first determines whether the expiration time window has elapsed. If so, EDP computing device 230 does not proceed with completing the computer interaction based on a determination that the user did not wish to proceed or responded too late and thus the interaction should not be completed to ensure security. Otherwise, EDP computing device 230 extracts the response token and interprets it as confirmation that the user wishes to complete the computer interaction. EDP computing device 230 uses the response token to retrieve 226 the protected data object from the memory device. Specifically, the response token includes a selection of a user account by the user. So EDP computing device 230 uses the user account selection to retrieve one or more protected data objects that are associated with the selected user account.

In the case of a payment transaction, EDP computing device 230 is configured to retrieve one or more payment account data objects to complete the transaction. These may include a payment account number, an expiration date, a payment network identifier, a special password or passcode, or the like. Using the retrieved protected data object(s), EDP computing device 230 processes and completes the computer interaction. Again, using the payment transaction example, completing the computer interaction may involve transmitting the payment account data objects along with transaction data to an issuing bank computing device. The issuing bank computing device may be associated with an issuing bank that maintains a financial account for the user. The issuing bank will confirm, for example, that the user has sufficient funds in the financial account to complete the payment transaction. After completing the interaction, EDP computing device 230 transmits 228 confirmation to business entity computing device and transmits 232 confirmation to user computing device 210.

Figure 3:
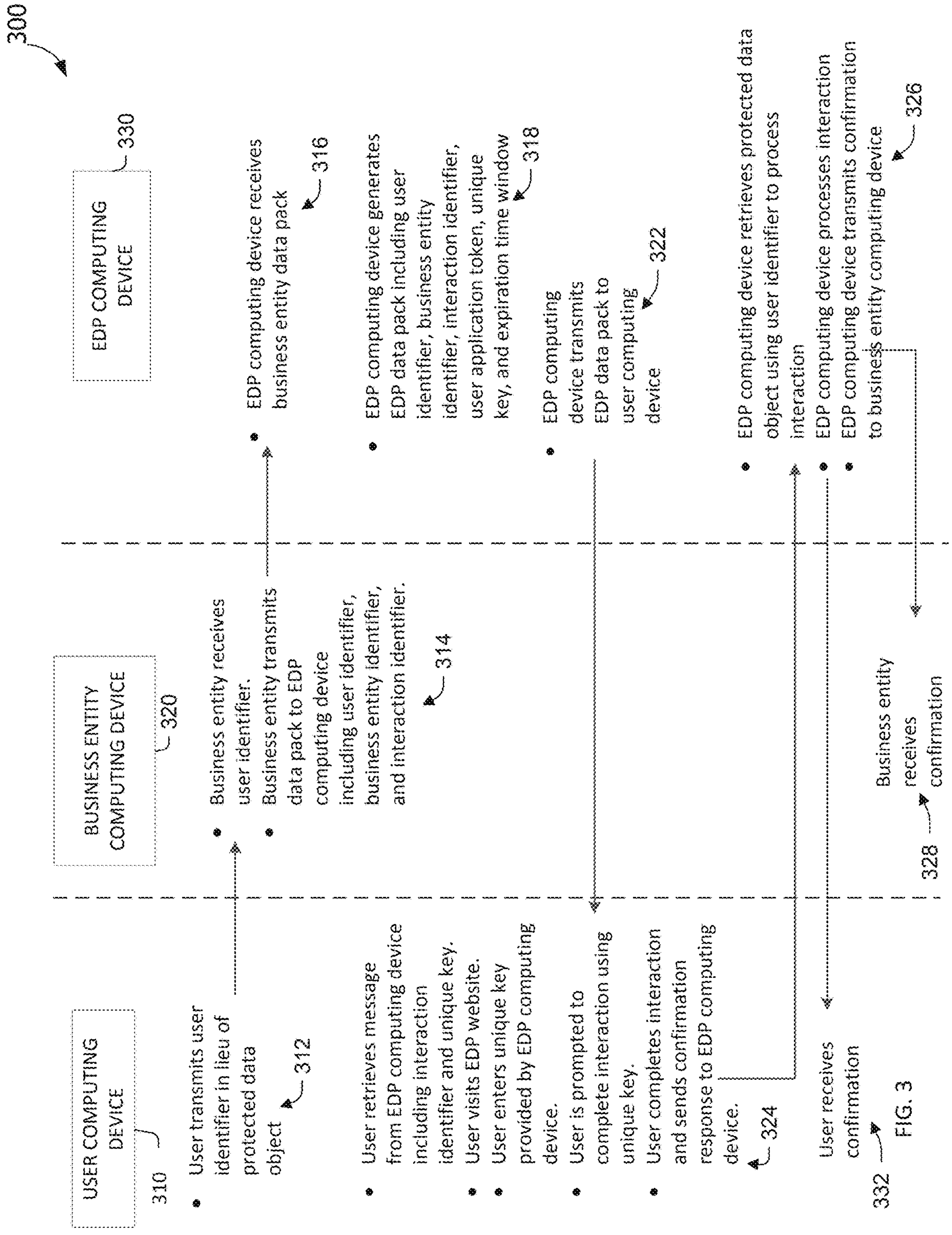

FIG. 3 shows an example message flow 300 by which an EDP computing device 330 (similar to EDP computing device 101 as described in FIG. 1) protects sensitive data of a user during a computer interaction. More specifically, FIG. 3 illustrates a flow where the user does not have a user application as described in FIG. 2. As shown, message flow 300 includes user computing device 310, business entity computing device 320, and EDP computing device 330. As shown in FIG. 3, message flow 300 begins when, during a computer interaction, a user uses user computing device 310 to transmit 312 a user identifier to business entity computing device 320. As described earlier, the computer interaction is such that a business entity computing device requires a protected data object (e.g., a payment card identifier) to continue the transaction.

However, when the user provides a user identifier instead of the protected data object, business entity computing device 320 creates a data packet at 314, referred to herein as interaction data. This interaction data includes the user identifier, in addition to a business entity identifier and an interaction identifier. Continuing with the example of a payment transaction, the business entity identifier may be a merchant name, and the interaction identifier may be a transaction identifier generated by a merchant. Business entity computing device 320 transmits the interaction data to EDP computing device 330.

EDP computing device 330 is configured to receive 316 the interaction data and use it to determine the protected data object that the user did not provide due to security concerns. As described earlier, EDP computing device 330 is communicatively coupled to a memory device (e.g., storage device 134 as described with respect to FIG. 1). In the example embodiment, the memory device stores protected data objects for various users (e.g. account data). More specifically, EDP computing device 330 extracts the user identifier from the interaction data and uses it to search the memory device for a corresponding protected data object. If the protected data object is found, EDP computing device 330 determines that it can proceed with the computer interaction. EDP computing device 330 further identifies that the user does not have a user application that manages user accounts. As a result, EDP computing device 230 generates a unique key identifier. The unique key identifier is a data point that will be used by EDP computing device 330 as a confirmation and authentication tool similar to the request token as described in FIG. 2. The unique key identifier may be a combination of alphanumeric characters generated by EDP computing device 330. The unique key identifier may also be a combination of other data points (e.g., the business entity identifier and the interaction identifier). Since there is no user application in this embodiment as described in FIG. 3, EDP computing device 230 will request the unique key identifier back from the user instead of a response token. Details of how the unique key identifier is transmitted back are described below.

EDP computing device 330 generates 318 a key request message that includes the user identifier, business entity identifier, interaction identifier, unique key identifier, a website address, and an expiration time window. At 322, EDP computing device 330 transmits the key request message to user computing device 310. Additionally, EDP computing device 330 tracks the elapsed time and continuously compares it to the end of the expiration time window in order to ensure that a response is received within the expiration time window. In this embodiment, EDP computing device 330 first determines that the user can use a specific communication channel to receive the key request message including the unique key identifier and other data. EDP computing device 330 determines that the user has one or more notification preferences that the user has previously input for communicating with the user. Various communication channels such as audio telephone communication, email communication, social network messages, or any similar communication channel is contemplated as part of this embodiment. For example, the user may prefer that communications be sent via SMS message. Accordingly, EDP computing device 330 is configured to transmit 322 the key request message using an SMS message.

The user receives 324 the key request message and accesses the data inside (e.g., by opening the SMS message). The key request message prompts the user to enter the included unique key at the included website in order to complete the interaction that is identified by the included interaction identifier. Other data may also be included in the key request message to assist the user, including interaction date/time and also interaction-specific data such as a transaction amount in the case of a payment transaction.

In the embodiment described herein, the user accesses the website represented by the website address and enters the unique key (e.g., in a specifically configured text box at the website). Entering the unique key identifier represents, to EDP computing device 330, that the user wishes to complete the computer interaction. Once EDP computing device 330 receives the unique key identifier, EDP computing device 330 first determines whether the expiration time window has elapsed. If so, EDP computing device 330 does not proceed with completing the computer interaction based on a determination that the user did not wish to proceed or responded too late and thus the interaction should not be completed to ensure security.

EDP computing device 330 uses the unique key identifier to retrieve 326 the protected data object from the memory device. In the case of a payment transaction, EDP computing device 330 is configured to retrieve one or more payment account data objects to complete the transaction. These may include a payment account number, an expiration date, a payment network identifier, a special password or passcode, or the like. Using the retrieved protected data object(s), EDP computing device 330 processes and completes the computer interaction. Again, using the payment transaction example, completing the computer interaction may involve transmitting the payment account data objects along with transaction data to an issuing bank computing device. The issuing bank computing device may be associated with an issuing bank that maintains a financial account for the user. The issuing bank will confirm, for example, that the user has sufficient funds in the financial account to complete the payment transaction. After completing the transaction, EDP computing device 330 transmits 328 confirmation to business entity computing device and transmits 332 confirmation to user computing device 310.

Figure 4:
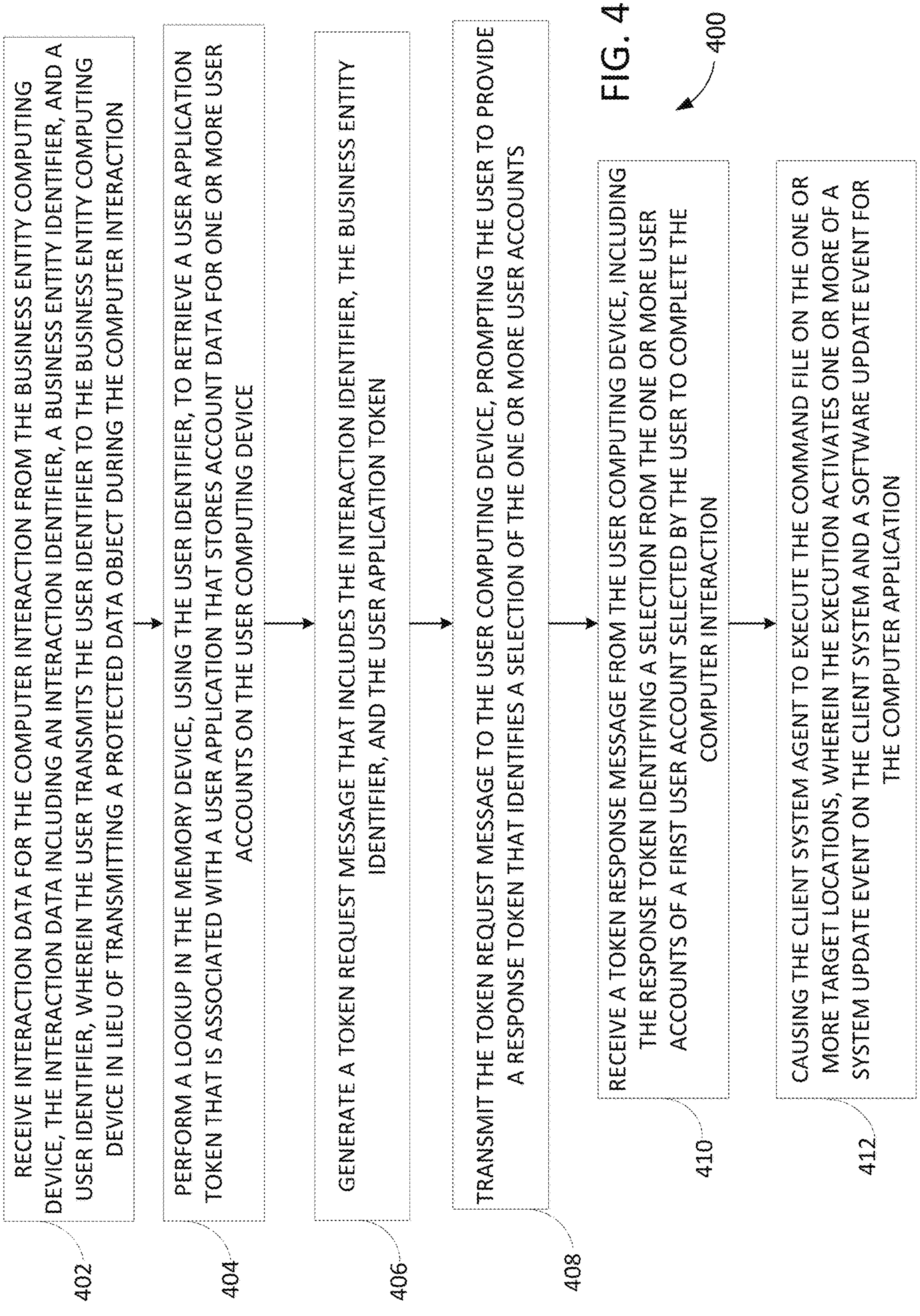

FIG. 4 shows an example method flow 400 illustrating how the EDP computing device protects sensitive data of a user during a computer interaction. In the example embodiment, EDP computing device 101 (shown in FIG. 1) is configured to receive 402 interaction data for the computer interaction from a business entity computing device. The interaction data includes an interaction identifier, a business entity identifier, and a user identifier. As described above with respect to FIGS. 2 and 3, the user transmits the user identifier to the business entity computing device in lieu of transmitting a protected data object during the computer interaction.

EDP computing device 101 is configured to generate 404 a token request message that includes the interaction identifier, the business entity identifier, and a request token. The request token is configured to establish a secure communication channel with a user application that stores account data for one or more user accounts on the user computing device. As described above, the user application may be, for example, an electronic wallet application that stores one or more financial accounts for a user to use during payment transactions with merchants.

EDP computing device 101 is further configured to transmit 406 the token request message to the user computing device. The token request message prompts the user to provide a response token that identifies a selection of the one or more user accounts. More specifically, when the token request message is received, it causes the user computing device to activate the user application and display the token request message. The user responds to the token request message by selecting an account from one of the accounts managed by the user application. The selection will be used to complete the computer interaction. The selection is processed by the user application and encapsulated in a token response message that is transmitted to EDP computing device 101.

EDP computing device 101 is configured to receive 408 the token response message from the user computing device. More specifically, the token response message includes the response token which represents confirmation by the user that the user wishes to complete the computer interaction. Additionally, the response token includes an identification of a user account that the user has selected to complete the interaction. The received response token causes EDP computing device 101 to perform 410 a lookup using the selected user account. The user account selection is used to retrieve a protected data object from the memory device and associated with the first user account. EDP computing device 101 uses the protected data object to complete 412 the computer interaction.

Figure 5:
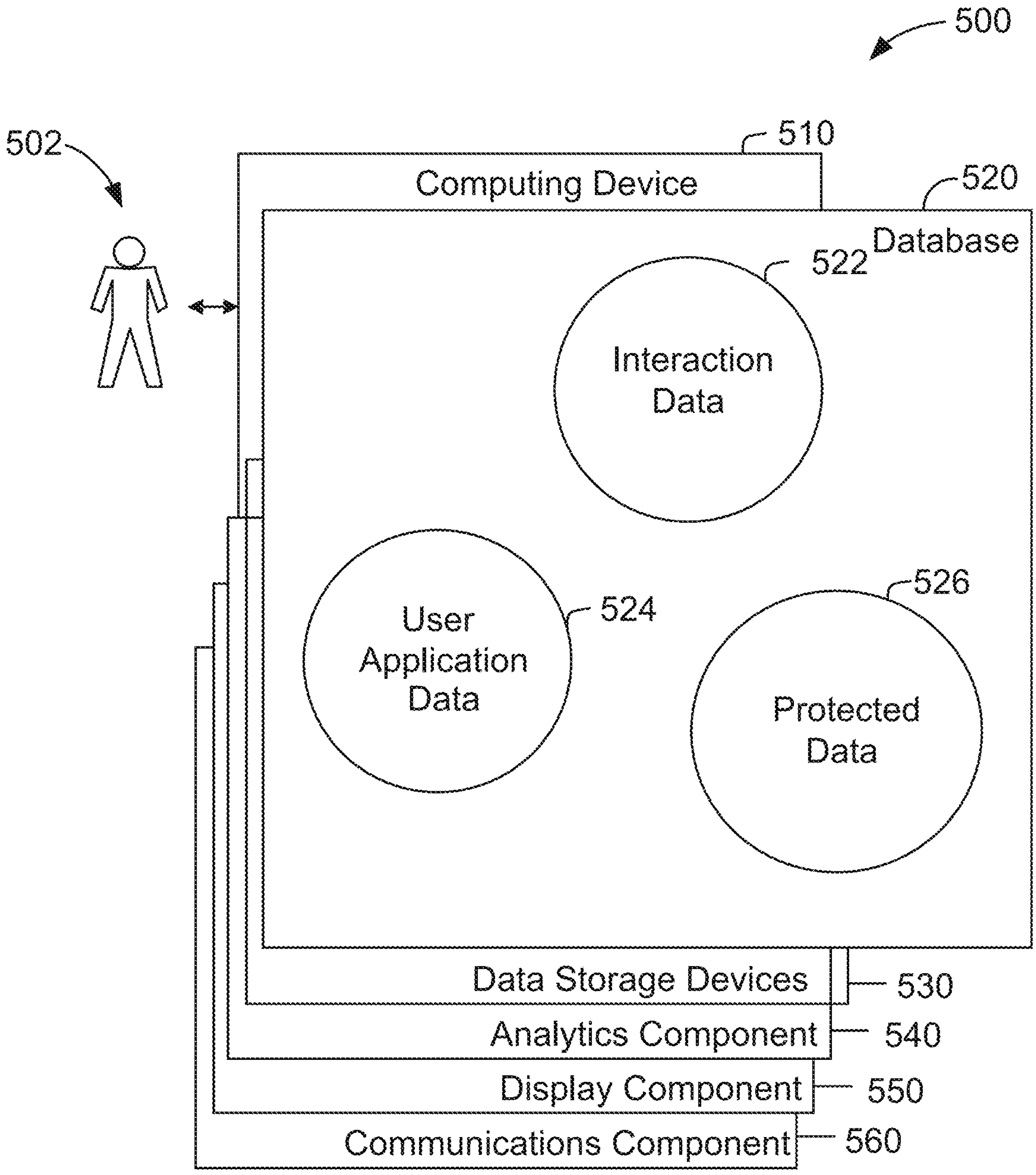

FIG. 5 shows an example configuration of a database 500 within a computer device, along with other related computer components, that may be used to protects sensitive data of a user during a computer interaction. In some embodiments, computer device 510 is similar to EDP computing device 101 (shown in FIG. 1). Operator 502 (such as a user operating EDP computing device 101) may access computer device 510 in order to manage data protection for one or more other users (such as the users described earlier that initiate computer interactions with business entities). In some embodiments, database 520 is similar to storage device 134 (shown in FIG. 1). In the example embodiment, database 520 includes interaction data 522, user application data 524, and protected data 526. Interaction data 522 includes received interaction identifiers and other data received from business entities with respect to computer interactions. User application data 524 includes data regarding user applications that communicate with EDP computing device 101. These include application identifiers, user identifiers, user data, user computing device data, and data linkages connecting these data. Protected data 526 includes data relating to user accounts to which EDP computing device 101 has access.

Computer device 510 also includes data storage devices 530. Computer device 510 also includes analytics component 540 that assists in determining user accounts that are associated with received user identifiers. Computer device 510 also includes display component 550 that can be used by user 502 to view the status of EDP computing device 101. Computer device 510 also includes communications component 560 which is used to communicate with remote computer devices (e.g., a user computing device). In one embodiment, communications component 560 is similar to communications interface 115 (shown in FIG. 1).

As will be appreciated based on the foregoing specification, the above-described embodiments of the disclosure may be implemented using computer programming or engineering techniques including computer software, firmware, hardware or any combination or subset thereof, wherein the technical effect is to establish and operate a filesystem-based application network. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electronic data protection (EDP) computing device for protecting a protected data object of a user during a current computer interaction in progress between a user computing device associated with the user and a third party computing device associated with a third party, the EDP computing device in communication with the user computing device and the third party computing device, the EDP computing device comprising at least one processor communicatively coupled to at least one memory device comprising a non-transitory computer readable medium including computer-executable instructions, wherein when executed by the at least one processor, the computer-executable instructions cause the at least one processor to:

receive interaction data for the current computer interaction from the third party computing device, the interaction data including an interaction identifier identifying the current computer interaction for which account data is requested, a third party identifier identifying the third party computing device, and a user identifier associated with the user, the user identifier corresponding to an unprotected data object including non-sensitive sharable information associated with the user;

generate, using at least in part the user identifier, a token request message including the interaction identifier, the third party identifier, and a request token;

transmit the token request message to the user computing device;

cause, using the token request message, the user computing device to activate a user application on the user computing device, wherein activating the user application includes i) displaying, on the user computing device, the interaction identifier, ii) prompting the user to select one of one or more user accounts stored on the user computing device, and iii) causing a secure communication channel to be established between the EDP computing device and the activated user application by requesting the user to confirm the user is a legitimate user allowed to initiate the current computer interaction;

in response to receiving token response message from the activated user application, perform a lookup in the at least one memory device, using the selected user account, for the protected data object associated with the selected user account; and complete the current computer interaction by transmitting i) the protected data object to an authorized party computing device different from the user computing device and the third party computing device, and ii) a confirmation that the current computer interaction has been completed to at least one of the third party computing device or the user computing device.

2. The EDP computing device of claim 1, wherein the at least one processor is further configured to transmit the token request message to the user computing device prior to performing the lookup in the at least one memory device for the protected data object.

3. The EDP computing device of claim 1, wherein the at least one processor is further configured to establish, using the request token, the secure communication channel between the EDP computing device and the activated user application by receiving, by the at least one processor via the secure communication channel from the activated user application executing on the user computing device, the token response message including authentication confirmation indicating that the user is the legitimate user and initiated the current computer interaction identified by the interaction identifier, the token response message including a response token generated by the activated user application, the response token identifying the selected user account without including the protected data object.

4. The EDP computing device of claim 1, wherein the protected data object includes at least a portion of sensitive information associated with the user and the selected user account, and wherein the protected data object is stored within the at least one memory device.

5. The EDP computing device of claim 1, wherein the at least one processor is further configured to receive, from the user computing device, a unique key identifier confirming that the user agrees to complete the current computer interaction, the unique key identifier previously transmitted by the EDP computing device to the user computing device.

6. The EDP computing device of claim 5, wherein the at least one processor is further configured to complete the current computer interaction in response to receiving the unique key identifier.

7. The EDP computing device of claim 1, wherein transmission of the protected data object to an authorized party maintaining sensitive information of the user is required to complete the current computer interaction, and wherein the authorized party is associated with the authorized party computing device.

8. A computer-implemented method for protecting a protected data object of a user during a current computer interaction in progress between a user computing device associated with the user and a third party computing device associated with a third party, the method implemented using an electronic data protection (EDP) computing device in communication with the user computing device and the third party computing device, the EDP computing device including at least one processor communicatively coupled to at least one memory device, the method performed by the at least one processor and comprising:

receiving interaction data for the current computer interaction from the third party computing device, the interaction data including an interaction identifier identifying the current computer interaction for which account data is requested, a third party identifier identifying the third party computing device, and a user identifier associated with the user, the user identifier corresponding to an unprotected data object including non-sensitive sharable information associated with the user;

generating, using at least in part the user identifier, a token request message including the interaction identifier, the third party identifier, and a request token;

transmitting the token request message to the user computing device;

causing, using the token request message, the user computing device to activate a user application on the user computing device, wherein activating the user application includes i) displaying, on the user computing device, the interaction identifier, ii) prompting the user to select one of one or more user accounts stored on the user computing device, and iii) causing a secure communication channel to be established between the EDP computing device and the activated user application by requesting the user to confirm the user is a legitimate user allowed to initiate the current computer interaction;

in response to receiving token response message from the activated user application, performing a lookup in the at least one memory device, using the selected user account, for the protected data object associated with the selected user account; and completing the current computer interaction by transmitting i) the protected data object to an authorized party computing device different from the user computing device and the third party computing device, and ii) a confirmation that the current computer interaction has been completed to at least one of the third party computing device or the user computing device.

9. The computer-implemented method of claim 8 further comprising transmitting the token request message to the user computing device prior to performing the lookup in the at least one memory device for the protected data object.

10. The computer-implemented method of claim 8 further comprising establishing, using the request token, the secure communication channel between the EDP computing device and the activated user application by receiving, by the at least one processor via the secure communication channel from the activated user application executing on the user computing device, the token response message including authentication confirmation indicating that the user is the legitimate user and initiated the current computer interaction identified by the interaction identifier, the token response message including a response token generated by the activated user application, the response token identifying the selected user account without including the protected data object.

11. The computer-implemented method of claim 8, wherein the protected data object includes at least a portion of sensitive information associated with the user and the selected user account, and wherein the protected data object is stored within the at least one memory device.

12. The computer-implemented method of claim 8 further comprising receiving, from the user computing device, a unique key identifier confirming that the user agrees to complete the current computer interaction, the unique key identifier previously transmitted by the EDP computing device to the user computing device.

13. The computer-implemented method of claim 12, wherein the at least one processor is further configured to complete the current computer interaction in response to receiving the unique key identifier.

14. The computer-implemented method of claim 8, wherein transmission of the protected data object to an authorized party maintaining sensitive information of the user is required to complete the current computer interaction, and wherein the authorized party is associated with the authorized party computing device.

15. At least one non-transitory computer readable medium that includes computer-executable instructions for protecting a protected data object of a user during a current computer interaction in progress between a user computing device associated with the user and a third party computing device associated with a third party, wherein when executed by an electronic data protection (EDP) computing device in communication with the user computing device and the third party computing device, and including at least one processor communicatively coupled to at least one memory device, the computer-executable instructions cause the at least one processor to:

receive interaction data for the current computer interaction from the third party computing device, the interaction data including an interaction identifier identifying the current computer interaction for which account data is requested, a third party identifier identifying the third party computing device, and a user identifier associated with the user, the user identifier corresponding to an unprotected data object including non-sensitive sharable information associated with the user;

generate, using at least in part the user identifier, a token request message including the interaction identifier, the third party identifier, and a request token;

transmit the token request message to the user computing device;

cause, using the token request message, the user computing device to activate a user application on the user computing device, wherein activating the user application includes i) displaying, on the user computing device, the interaction identifier, ii) prompting the user to select one of one or more user accounts stored on the user computing device, and iii) causing a secure communication channel to be established between the EDP computing device and the activated user application by requesting the user to confirm the user is a legitimate user allowed to initiate the current computer interaction;

in response to receiving token response message from the activated user application, perform a lookup in the at least one memory device, using the selected user account, for the protected data object associated with the selected user account; and complete the current computer interaction by transmitting i) the protected data object to an authorized party computing device different from the user computing device and the third party computing device, and ii) a confirmation that the current computer interaction has been completed to at least one of the third party computing device or the user computing device.

16. The at least one non-transitory computer readable medium of claim 15, wherein the computer-executable instructions further cause the at least one processor to transmit the token request message to the user computing device prior to performing the lookup in the at least one memory device for the protected data object.

17. The at least one non-transitory computer readable medium of claim 15, wherein the computer-executable instructions further cause the at least one processor to establish, using the request token, the secure communication channel between the EDP computing device and the activated user application by receiving, by the at least one processor via the secure communication channel from the activated user application executing on the user computing device, the token response message including authentication confirmation indicating that the user is the legitimate user and initiated the current computer interaction identified by the interaction identifier, the token response message including a response token generated by the activated user application, the response token identifying the selected user account without including the protected data object.

18. The at least one non-transitory computer readable medium of claim 15, wherein the protected data object includes at least a portion of sensitive information associated with the user and the selected user account, and wherein the protected data object is stored within the at least one memory device.

19. The at least one non-transitory computer readable medium of claim 15, wherein the computer-executable instructions further cause the at least one processor to receive, from the user computing device, a unique key identifier confirming that the user agrees to complete the current computer interaction, the unique key identifier previously transmitted by the EDP computing device to the user computing device.

20. The at least one non-transitory computer readable medium of claim 15, wherein transmission of the protected data object to an authorized party maintaining sensitive information of the user is required to complete the current computer interaction, and wherein the authorized party is associated with the authorized party computing device.

* * * * *